United States Patent
Yamashita et al.

(10) Patent No.: US 9,006,640 B2
(45) Date of Patent: Apr. 14, 2015

(54) IMAGE PICKUP APPARATUS CAPABLE OF SWITCHING BETWEEN MODES TO REDUCE POWER CONSUMPTION

(71) Applicant: Canon Kabushiki Kaisha, Tokyo (JP)

(72) Inventors: Yuichiro Yamashita, Hsinchu (TW); Takashi Matsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 13/801,353

(22) Filed: Mar. 13, 2013

(65) Prior Publication Data
US 2013/0248688 A1    Sep. 26, 2013

(30) Foreign Application Priority Data

Mar. 21, 2012 (JP) ................ 2012-063731

(51) Int. Cl.
*H03F 3/08* (2006.01)
*H04N 5/369* (2011.01)
*H04N 5/357* (2011.01)

(52) U.S. Cl.
CPC ............. *H04N 5/3698* (2013.01); *H04N 5/357* (2013.01)

(58) Field of Classification Search
USPC ......... 250/214 A, 214.1, 214 R, 208.1, 208.2, 250/214 DC; 348/208.16, 220.1, 333.13
See application file for complete search history.

(56) References Cited

U.S. PATENT DOCUMENTS

2004/0227700 A1* 11/2004 Onozawa et al. ............... 345/60
2005/0138447 A1*  6/2005 Kobayashi et al. ........... 713/300
2012/0199724 A1*  8/2012 Nomura et al. ............ 250/208.1

FOREIGN PATENT DOCUMENTS

JP    2009-224524 A    10/2009

* cited by examiner

*Primary Examiner* — Francis M Legasse, Jr.
(74) *Attorney, Agent, or Firm* — Canon USA, Inc. IP Division

(57) ABSTRACT

An embodiment of an image pickup apparatus according to the present invention includes, on a semiconductor substrate, an imaging area having a plurality of pixel columns and a plurality of column circuits each of which is provided for each pixel column or a plurality of pixel columns. Each of the column circuits has a first circuit block and a second circuit block, and the first and second circuit blocks receive a bias voltage via a common wire. The first circuit block includes an amplifier circuit. The second circuit block is configured to be capable of switching between a first mode and a second mode with smaller power consumption than the first mode. A shift period from the second mode to the first mode by the second circuit block is a period excluding a period during which an amplifier circuit in the first circuit block is performing an amplifying operation.

9 Claims, 11 Drawing Sheets

IMAGE PICKUP APPARATUS CAPABLE OF SWITCHING BETWEEN MODES TO REDUCE POWER CONSUMPTION

BACKGROUND OF THE INVENTION

1. Field of the Invention

The present invention relates to image pickup apparatuses and particularly relates to reduction of power consumption.

2. Description of the Related Art

A solid-state image pickup apparatus generally has an imaging area in which pixels are arranged in matrix form. A column circuit is provided for each pixel column or a plurality of pixel columns. The column circuit may be an amplifier circuit, a noise reduction circuit, an analog-digital converting circuit or the like. As an example of such a solid-state image pickup apparatus, a configuration disclosed in Japanese Patent Laid-Open No. 2009-224524 has been known.

According to Japanese Patent Laid-Open No. 2009-224524, when a signal is transferred from a pixel to one hold capacitor of two hold capacitors which stores or holds signals transmitted at different times via column signal lines, the changes in potential of a reference power supply electrode in the other hold capacitor may be inhibited.

In recent years, the reduction of power consumption in a solid-state image pickup apparatus has been a large problem.

The present inventor, et al. have found a new problem in a configuration in which different circuit blocks included in a column circuit receive a power supply voltage or a ground potential from a common wire. More specifically, when a circuit block is operated by switching between a first mode with large power consumption and a second mode with small power consumption, noise due to mutual influence on signals may possibly occur in different circuit blocks which receive voltage from a common wire.

The present invention provides a solid-state image pickup apparatus which may inhibit an increase of noise even in a configuration having an operation of reducing power consumption.

SUMMARY OF THE INVENTION

In view of the problem, the present invention provides a solid image pickup apparatus including, on a semiconductor substrate, an imaging area having a plurality of pixel columns and a plurality of column circuits each of which is provided for each pixel column or a plurality of pixel columns. In this case, each of the column circuits has a first circuit block and a second circuit block, and the first and second circuit blocks receive bias voltage via a common wire. The first circuit block includes an amplifier circuit. The second circuit block is configured to be capable of switching between a first mode and a second mode with smaller power consumption than the first mode, and a shift period from the second mode to the first mode by the second circuit block is a period excluding a period when an amplifier circuit in the first circuit block is performing an amplifying operation.

Further features of the present invention will become apparent from the following description of exemplary embodiments with reference to the attached drawings.

DESCRIPTION OF THE EMBODIMENTS

An image pickup apparatus according to an embodiment of the present invention includes, on a semiconductor substrate, an imaging area having a plurality of pixel columns and a plurality of column circuits each of which is provided for each pixel column or a plurality of pixel columns. Each of the column circuits has a first circuit block and a second circuit block, and the first and second circuit block receive a bias voltage via a common wire. For example, the first circuit block includes an amplifier circuit, and the second circuit block is a signal holding unit including a buffer. Each of the circuit blocks may receive a ground potential from a common ground wire, for example. In this configuration, the second circuit block is configured to be capable of switching between a first mode and a second mode with smaller power consumption than the first mode. A shift period from the second mode to the first mode by the second circuit block is a period excluding a period during which an amplifier circuit in the first circuit block is performing an amplifying operation. This configuration may inhibit noise.

First Embodiment

Figure 1:
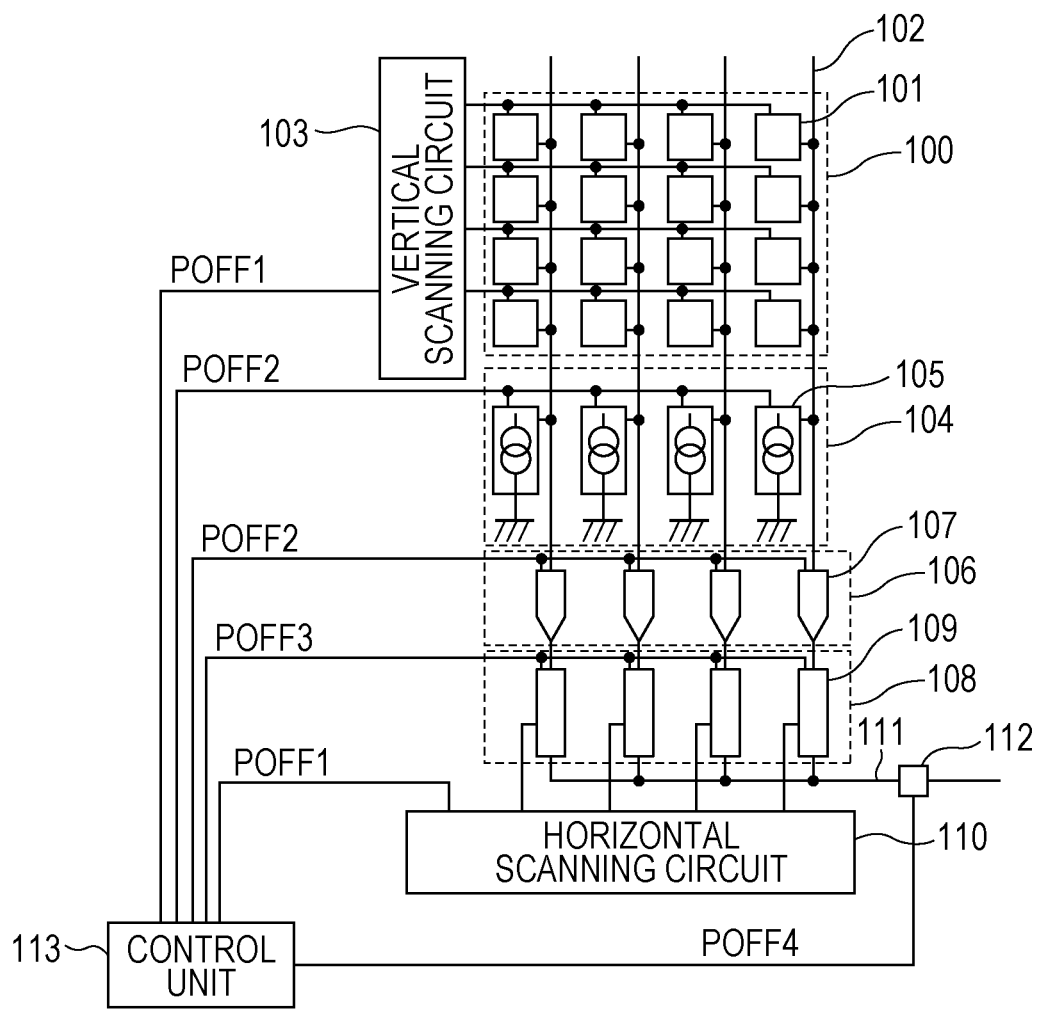
FIG. 1 is a block diagram of an image pickup apparatus according to a first embodiment.

FIG. 1 is an overall block diagram of an image pickup apparatus according to a first embodiment.

A plurality of pixels 101 are arranged in an imaging area 100. The imaging area 100 here has a total of 16 pixels of 4 rows and 4 columns but may have more pixels. The configuration of the pixels 101 may vary. For example, what-is-called an APS sensor having a photoelectric conversion unit and a pixel amplifying unit which amplifies a signal generated in the photoelectric conversion unit may be used to improve its SN ratio.

The signals generated in the pixels 101 are output to a vertical signal lines 102 in response to a drive pulse from a vertical scanning circuit 103. For example, a drive pulse may be supplied to each row, and signals of a plurality of pixels included in the row are output to the corresponding vertical signal lines 102 in parallel. In FIG. 1, one vertical signal line 102 is provided for each pixel column. However, a plurality of vertical signal lines 102 may be provided for each pixel column. In this case, a plurality of pixel rows may output signals to their corresponding vertical signal lines 102 in response to a drive pulse from the vertical scanning circuit 103.

A bias supply block 104 is a circuit which supplies a bias current or a bias voltage to the pixels 101 via the vertical signal lines 102. The bias supply block 104 has a bias circuit 105 provided for each of the vertical signal lines 102. A current source is used as the bias circuit 105 herein.

A column circuit block 106 receives signals output to the plurality of vertical signal lines 102 in parallel. Column circuits 107 are provided correspondingly to the vertical signal lines 102. Each of the column circuits 107 may be at least one of, a plurality of combinations of or all of an amplifier circuit, a noise reduction circuit and an analog-digital converting circuit. An amplifier circuit is used as an example of the column circuit 107 in the following descriptions.

A signal holding block 108 stores or holds signals output from the column circuits 107 in signal holding units 109 provided correspondingly to the column circuits 107. Each of the signal holding units 109 has a circuit which receives a bias voltage or a bias current. For example, the circuit may be an amplifier circuit or a buffer circuit.

A horizontal scanning circuit 110 supplies a drive pulse to the signal holding block 108 and causes the signal holding block 108 to output signals held in the signal holding block 108 sequentially or randomly to a horizontal signal line 111. One or a plurality of horizontal signal lines 111 may be provided. An output unit 112 amplifies signals output to the horizontal signal line 111 and outputs them to outside of the image pickup apparatus.

A control unit 113 supplies a control pulse to a predetermined circuit block in the image pickup apparatus. In response to the control pulse, the predetermined circuit block may be operated by switching between a first mode and a second mode with smaller power consumption than the first mode. In this embodiment, the control unit 113 supplies a control pulse POFF1 to the horizontal scanning circuit 110 and supplies a control pulse POFF2 to the power supply circuit 104 and column circuit block 106. The control unit 113 further supplies a control pulse POFF3 to the signal holding block 108 and supplies a control pulse POFF4 to the output unit 112.

Figure 2:
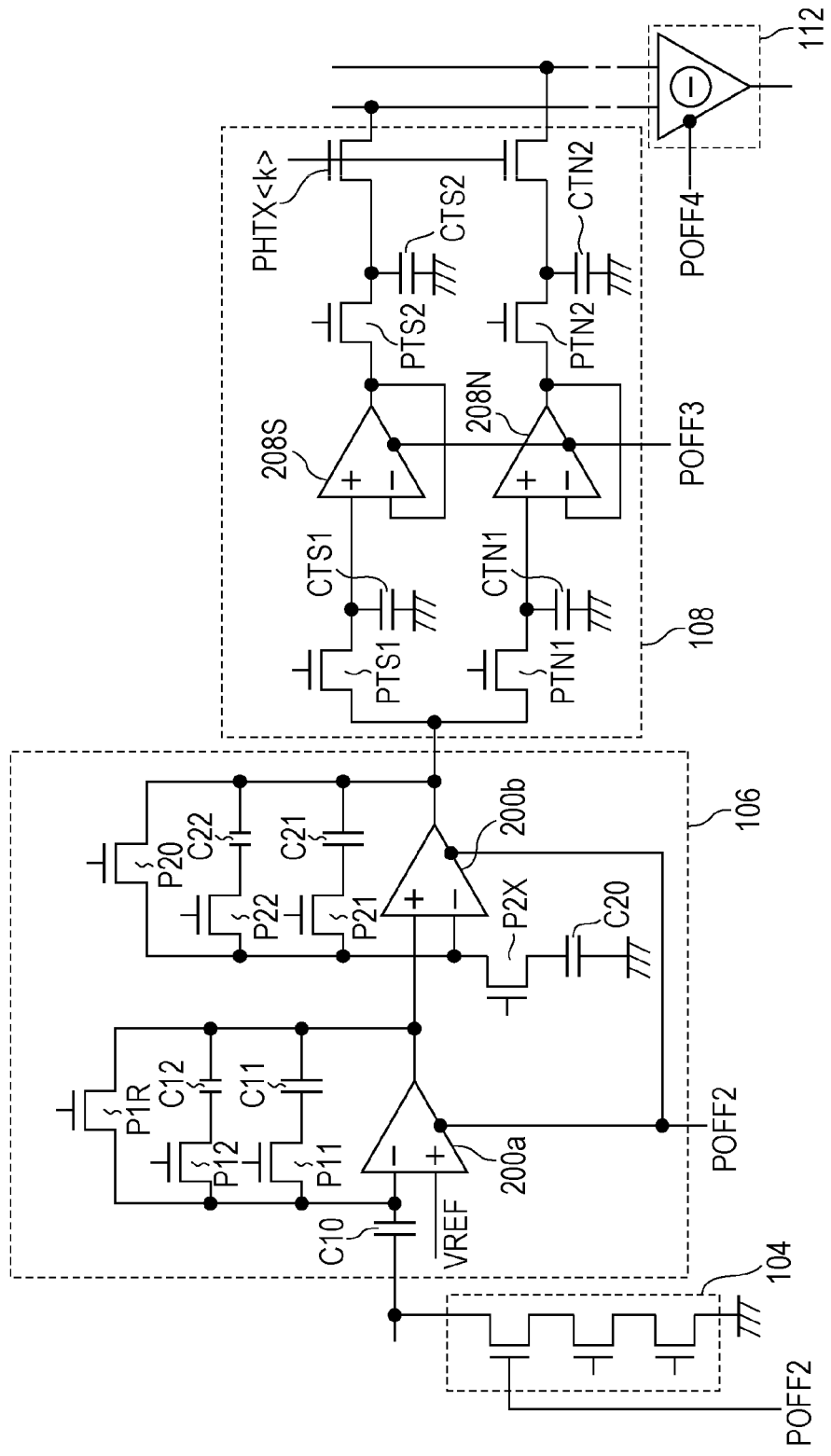
FIG. 2 is an equivalent circuit diagram of a column circuit in an image pickup apparatus according to the first embodiment.
Figure 3:
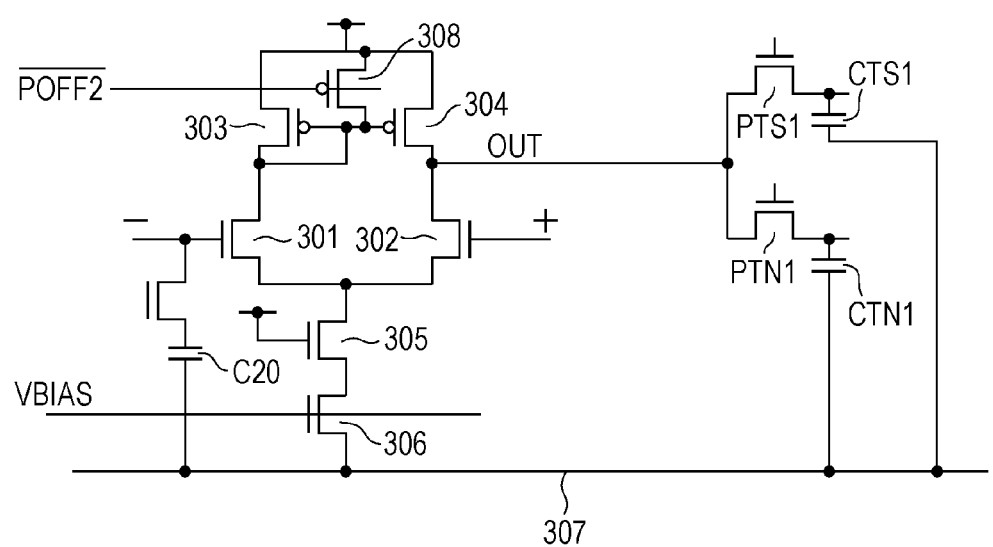
FIG. 3 is an equivalent circuit diagram of a part of the column circuit of the first embodiment.

FIG. 2 illustrates an example of an equivalent circuit diagram including the bias circuits 105, column circuits 107, signal holding units 109 and output unit 112 according to this embodiment. FIG. 3 illustrates an equivalent circuit diagram of parts of the column circuits 107 and signal holding units 109. Like numerals refer to components having like functions to those in FIG. 1.

The bias circuit 105 includes three transistors. The bias circuit 105 has a common-source amplifying first transistor and a second transistor electrically connected to a drain of the first transistor, from the bottom of the drawing. The bias circuit 105 further has a third transistor having one of a source and a drain electrically connected to the second transistor and the other electrically connected to the vertical signal line 102. The first transistor is a transistor which configures a current mirror circuit along with a transistor, not illustrated. The second transistor is for inhibiting changes in potential of the drain of the first transistor, and the use of the second transistor may provide a cascode current source. The third transistor is a transistor which controls electric connection with the vertical signal line 102 in response to a control pulse POFF1 supplied to its gate. If the third transistor is out of conduction, the power supply circuit 104 operates in the second mode. If it is in conduction, the power supply circuit 104 operates in the first mode. Alternatively, the third transistor may be configured to supply a control pulse POFF1 to a gate of the second transistor.

The column circuit 107 may include an amplifier circuit 200a in a previous stage and an amplifier circuit 200b in a subsequent stage. Each of the amplifier circuits 200a and 200b may include an operational amplifier circuit.

The vertical signal line 102 is electrically connected to an inverting input node of the amplifier circuit 200a in the previous stage via an input capacitor C10. The input capacitor C10 may be used as a clamp capacitor to configure a circuit that inhibits reset noise in the pixels 101.

A predetermined reference voltage VREF is supplied to a non-inverting input node thereof. A switch may be provided on an electrical path between the input capacitor C10 and the vertical signal line 102 for controlling the electrical conduction. A plurality of feedback paths are provided in parallel on an electrical path between the inverting input node and an output node of the amplifier circuit 200a in the previous stage. A switch P1R is provided on a first feedback path. The switch P1R is for performing a reset operation on the amplifier circuit 200a in the previous stage. The switch P1R may further be for causing the amplifier circuit 200a in the previous stage to perform a voltage follower operation. A switch P11 and a first feedback capacitor C11 are provided on a second feedback path. A switch P12 and a second feedback capacitor C12 are provided on a third feedback path. The first feedback capacitor C11 and the second feedback capacitor C12 have different feedback capacitances. Exclusively, operating the switches P12 and P13 may allow amplification of signals with different gains. Two feedback capacitors are provided in this embodiment. However, another feedback capacitor with a different capacitance value may be provided in parallel to implement multi-step gain switching. These components may be included in the amplifier circuit 200a in the previous stage. The amplifier circuit 200a in the previous stage is configured to be capable of switching between a gain variable inverting amplifier circuit and a voltage follower circuit.

Next, the amplifier circuit 200b in the subsequent stage will be described. A non-inverting input node of the amplifier circuit 200b in the subsequent stage is connected to an output node of the amplifier circuit 200b in the subsequent stage. In other words, a signal from the amplifier circuit 200b in the subsequent stage is received by the non-inverting input node. The inverting input node receives a predetermined voltage via the switch P2X and capacitor C20. In this embodiment, a ground potential is supplied thereto. A plurality of feedback paths are provided in parallel on an electrical path between the inverting input node and an output node of the amplifier circuit 200b in the subsequent stage. A switch P20 is provided on a first feedback path. The switch P20 is for performing a reset operation on the amplifier circuit 200b in the subsequent stage. The switch P20 may further be for causing the amplifier circuit 200b in the subsequent stage to perform a voltage follower operation. A switch P21 and a first feedback capacitor C21 are provided on a second feedback path. A switch P22 and a second feedback capacitor C22 are provided on a third feedback path. The first feedback capacitor C21 and the second feedback capacitor C22 have different feedback capacitances. Exclusively, operating the switches P21 and P22 may allow amplification of signals with different gains. Two feedback capacitors are provided in this embodiment. However, another feedback capacitor with a different capacitance value may be provided in parallel to implement multi-step gain switching. These components may be included in the amplifier circuit 200b in the subsequent stage. The amplifier circuit 200b in the subsequent stage is configured to be capable of switching between a gain variable non-inverting amplifier circuit and a voltage follower circuit.

In this embodiment, the gain variable inverting amplifier circuit in the previous stage and the gain variable non-inverting amplifier circuit in the subsequent stage configure an entire column amplifier circuit. Therefore, high gains may not be required to set for the amplifier circuits. In a specific gain combination, if the amplifier circuit 200a in the previous stage has a gain setting of 64 and the amplifier circuit 200b in the subsequent stage has a gain setting of 4, the column amplifier circuit may have a gain setting of 256. In order to provide a gain setting of 256 by one amplifier circuit may require an increase of the size of the amplifier circuit. The sizes of transistors included in the amplifier circuit may be increased, which may increase power consumption. It may further increase the differences between gains of the column amplifier circuits. This is because, for example, a significantly small capacitor that is equal to 256th of a basic capacitor may also be required, and such a capacitor is sensitive to manufacturing variations. Alternatively, a design for power saving may have a reduced cut-off frequency, which may significantly reduce its response speed and hinder its increases in speed.

The mode may be switched for operations between a mode in which gains are applied by both of the amplifier circuits 200a and 200b in the previous stage and subsequent stage and a mode in which one or more gains are applied by the amplifier circuit in at least one of the previous stage and subsequent stage, such as the amplifier circuit 200a in the previous stage, and the amplifier circuit in the subsequent stage may be caused to perform a voltage follower operation.

The amplifier circuits 200a and 200b in the previous stage and subsequent stage receive a control pulse POFF2.

The signal holding unit 109 has a system which stores or holds a noise signal and a system which stores or holds an optical signal. The optical signal-related system will be denoted by S, and the noise signal-related system will be denoted by N. Both of them may have an identical circuit configuration. In this case, a system which stores or holds an optical signal will be described.

The signal holding unit 109 may include a first switch PTS1, a first signal holding unit CTS1, a buffer 208S, a second switch PTS2, a second signal holding unit CTS2 and a third switch PHTX.

The first switch PTS1 is a switch for storing or holding a signal processed by the column circuit 107. The first signal holding unit CTS1 is a capacitor for storing or holding an optical signal. The buffer circuit 208S buffers an optical signal held in the first signal holding unit CTS1 and outputs it to a circuit in the subsequent stage. The buffer circuit 208S may be a voltage follower circuit, for example.

The second switch PTS2 is a switch for holding a signal processed by the buffer circuit 208S in the second signal holding unit CTS2.

The third switch PHTX(k) is a switch for outputting a signal held in the second signal holding unit CTS2 to the horizontal signal line 111. The signal output to the horizontal signal line 111 is amplified by the output unit 112 and is read to outside of the image pickup apparatus. In this embodiment, the horizontal signal line 111 has an optical signal horizontal signal line 111S to which an optical signal is read and a noise signal horizontal signal line 111N. There may be provided a plurality of pairs of horizontal signal lines 111 to which an optical signal and a noise signal are read. The noise signals here mainly occur in the column circuit.

FIG. 3 is an equivalent circuit diagram illustrating a main part of the amplifier circuit 200b in the subsequent stage and parts of the first switches PTS1 and PTN1 and first signal holding units CTS1 and CTN1 in the signal holding unit 109. Like numbers refer to like components to those in FIG. 2, and the detail descriptions will be omitted.

The amplifier circuit 200b in the subsequent stage has a first input transistor 301 provided at the inverting input node and a second input transistor 302 provided at the non-inverting input node. P-type transistors 303 and 304 having their gates connected to each other configure an active load on a power supply side. A common-gate transistor 305 and a load transistor 306 configure an active load on a ground side. A source of the load transistor 306 is electrically connected to a wire 307 to which a ground potential is supplied. The wire 307 is further electrically connected to a counter node of a node which receives signals from the first signal holding units CTS and CTN.

The amplifier circuit 200b in the subsequent stage having this configuration further has a mode switching transistor 308. The mode switching transistor 308 has a drain connected to gates of the p-type transistors 303 and 304 having their gates connected to each other. A gate of the mode switching transistor 308 receives a control pulse POFF2. If the mode switching transistor 308 is brought into conduction, the potential at the gates of the p-type transistors 303 and 304 having their gates connected to each other comes to have a power supply voltage, and the p-type transistors 303 and 304 having their gates connected are turned off. This turns off the amplifier circuit 200b in the subsequent stage, and the amplifier circuit 200b in the subsequent stage is switched to the second mode. Alternatively, the active load on the ground potential side may have a circuit for stopping current supply or reducing the amount of current supply as a mode switching circuit.

Figure 4:
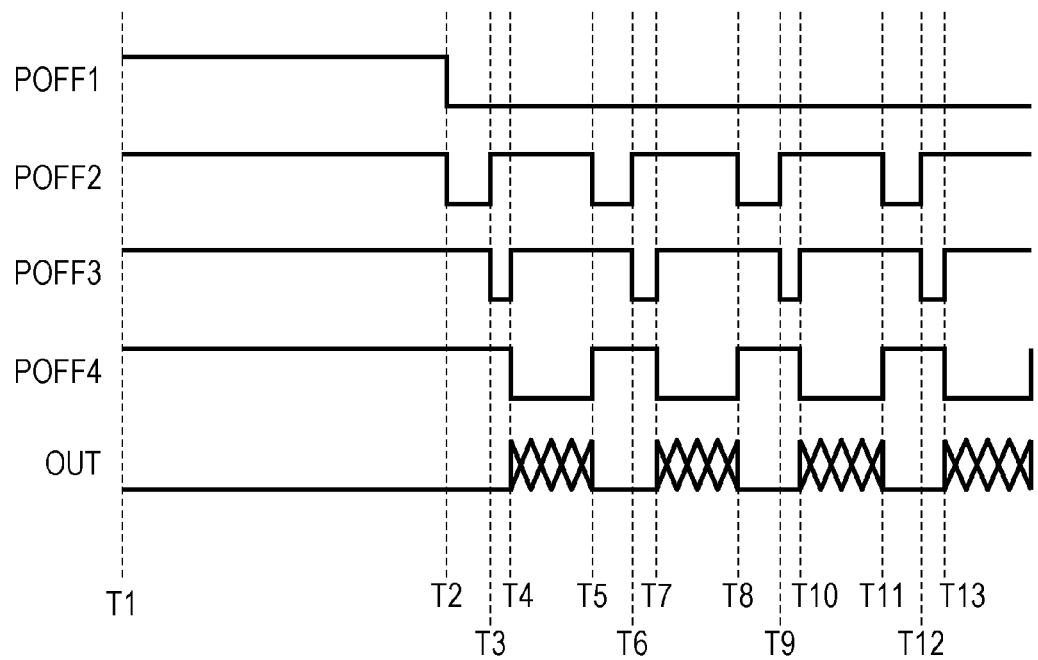
FIG. 4 illustrates drive pulses of the image pickup apparatus of the first embodiment.

FIG. 4 illustrates drive pulses of the image pickup apparatus of the first embodiment. FIG. 4 substantially corresponds to FIG. 1 and illustrates control pulses POFF1 to POFF4 for switching the mode of the circuit blocks and periods during which signals are being read to the horizontal signal line. The control pulses POFF1 to POFF4 are switched to the second mode that is a mode with small power consumption when the pulses have a high level. In this embodiment, the circuit blocks have an OFF state in the second mode.

During a period T1-T2, the control pulses POFF1 to POFF4 have a high level. Thus, the bias supply block 104, column circuit block 106, signal holding block 108, vertical scanning circuit 103, horizontal scanning circuit 110, and output unit 112 are in the second mode. During the period, signals are stored in the pixels 101.

At a time T2, the control pulses POFF1 and POFF2 shift from a high level to a low level. This switches the bias supply block 104, column circuit block 106, vertical scanning circuit 103, and horizontal scanning circuit 110 to the first mode. For example, the circuits are shifted from an OFF state to an ON state. The control pulses POFF3 and POFF4 keep a high level. In other words, the signal holding block 108 and output unit 111 are in the second mode and may have an OFF state, for example.

At a time T3, the control pulse POFF2 shifts from a low level to a high level. This switches the bias supply block 104 and column circuit block 106 from the first mode to the second mode. The control pulse POFF3 shifts from a high level to a low level. This switches the signal holding block 108 from the second mode to the first mode.

At a time T4, the control pulse POFF4 shifts from a high level to a low level. This switches the output unit 112 from the second mode to the first mode. During a period T4-T5, signals from the columns are read to the horizontal signal line 111.

At a time T5 and subsequent times, the operations during the period T3-T5 are repeated, and signals from the rows are read.

Figure 5:
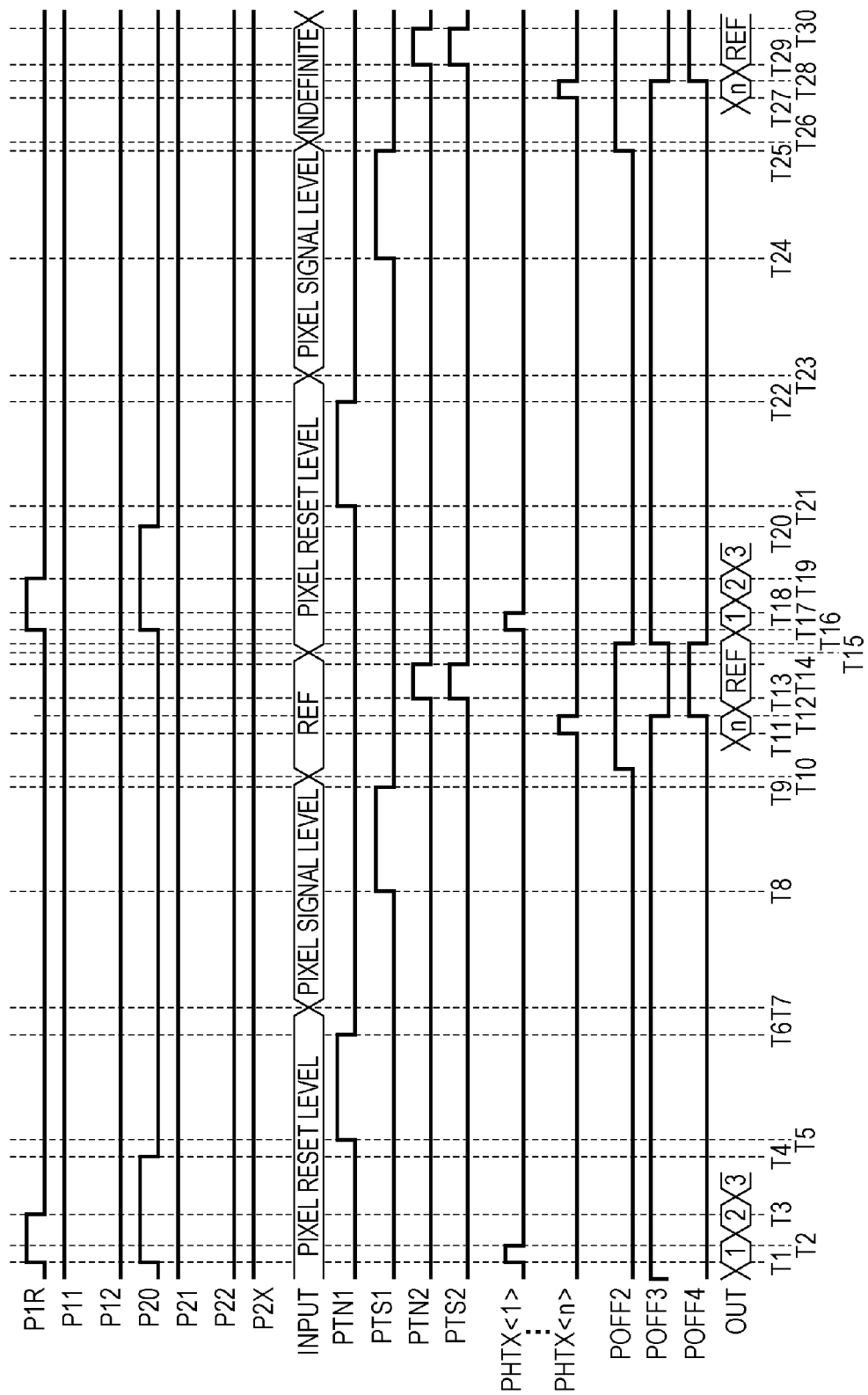
FIG. 5 illustrates drive pulses of the image pickup apparatus of the first embodiment.

FIG. 5 illustrates drive pulses in more detail. The references given to the control pulses correspond to the references in FIGS. 3 and 4. FIG. 5 illustrates the time T2 and subsequent times in FIG. 4. The control pulse POFF1 has a low level.

For the control pulse POFF2, the period T1-T9 in FIG. 5 corresponds to the period T2-T3 in FIG. 4. In other words, in the period, the column circuit block 106 is in the first mode, that is, it does not perform a normal amplifying operation. During the period T5-T6, the control pulse PTN1 has a high level, and the first signal holding unit CTN1 holds a noise signal. At that time, a pixel reset level is supplied to the input node of the column circuit block 106. During the period T8-T9, the control pulse PTS1 has a high level, and the first signal holding unit CTS1 holds an optical signal. At that time, a pixel signal level is supplied to the input node of the column circuit block 106.

The column circuit block 106 and the signal holding block 108 receive a ground potential from a common ground wire. In this configuration, an operation by one circuit block may easily have an influence on an operation by another circuit block. Accordingly, in this embodiment, the time when the control pulse POFF3 supplied to the signal holding block 108 shifts from a high level to a low level is set differently from the period during which the column circuit block 106 is operating. Particularly, the time may be set in a period excluding the period T5-T6 and period T8-T9 during which an essential operation is being performed in the column circuit block 106. In this embodiment, referring to FIG. 5, the control pulse POFF3 shifts from a high level to a low level at a time T12 after a lapse of a predetermined period of time from a time T9. The predetermined period of time delayed from the time T9 may be set properly but may be at least a period equivalent to one clock of a main clock. The time for the shift of the control pulse from a low level to a high level may be set in a different period from the period during which the column circuit block 106 is operating.

Furthermore, the shift may be achieved when the control pulse PTN1 shifts to a low level.

The time when the mode of the column circuit block 106 is switched may be set such that it may not have an influence on a signal held in the signal holding block 108 as much as possible. More specifically, the signal holding block 108 stores or holds a signal during a period T13-T14. Therefore, the control pulse POFF2 may be shifted from a high level to a low level in a different period from the period T13-T14. According to this embodiment, the control pulse POFF2 is shifted from a high level to a low level at a time T16 after a lapse of a predetermined period of time from the time T14. The predetermined period of time delayed from the time T14 may be set properly but may be at least a period equivalent to one clock of a main clock.

The control pulses POFF2 and POFF3 may be shifted in a period during which the output unit 112 is outputting a reference signal REF.

The control pulse POFF4 may be shifted at a time that is different by a predetermined period of time from the time when the control pulses PTS1 and PTS2 and PTN1 and PTN2 shift from a high level to a low level. The predetermined period of time may be a period equivalent to one clock or longer of a main clock.

During the period when signals are stored in the pixels 101, not illustrated in FIG. 5, all of the control pulses POFF2 to POFF4 are in the second mode, that is, a mode with small power consumption.

Second Embodiment

Figure 6:
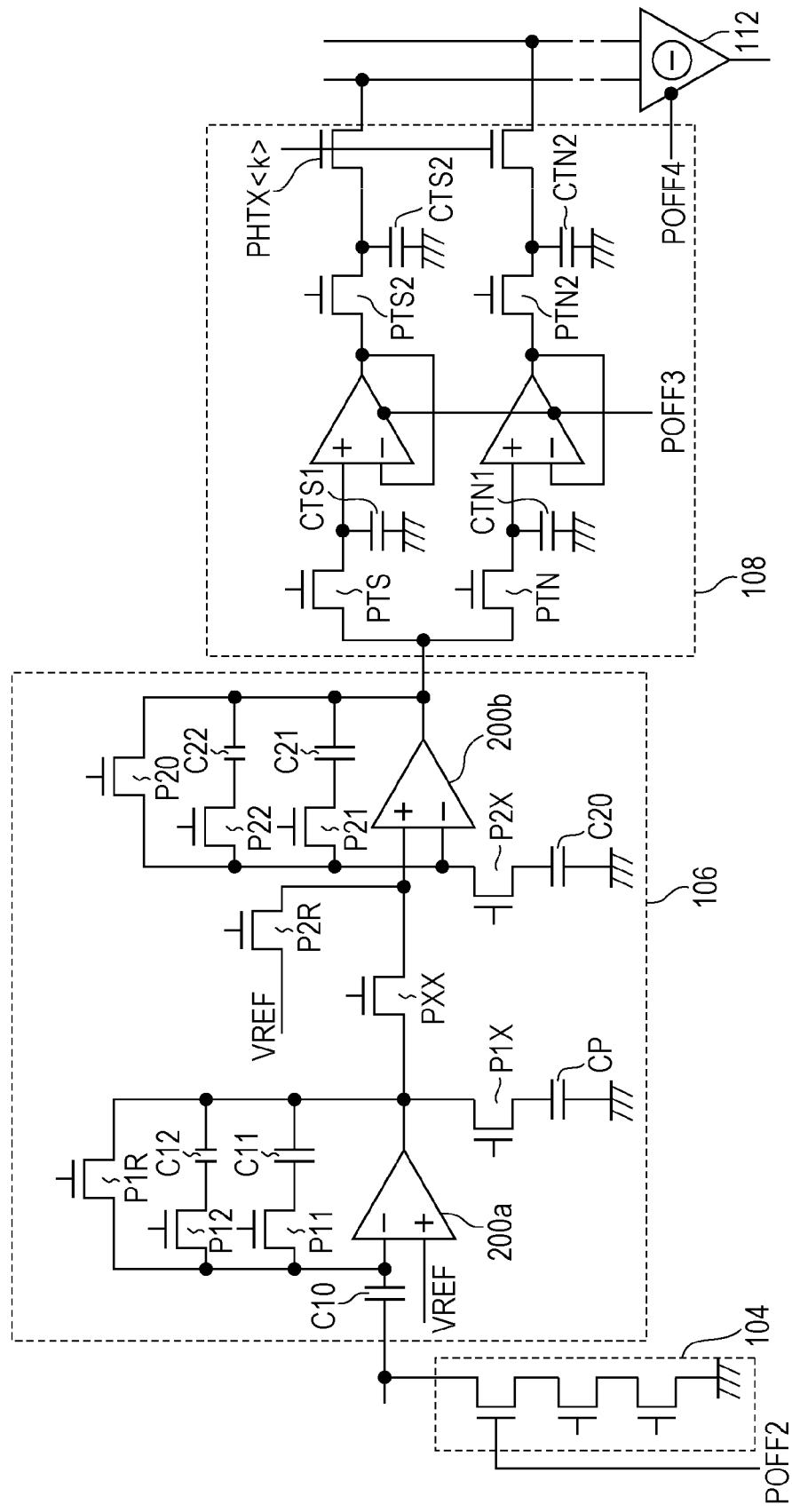
FIG. 6 is an equivalent circuit diagram of a column circuit in an image pickup apparatus of a second embodiment.

FIG. 6 is an equivalent circuit diagram of a column circuit in an image pickup apparatus of a second embodiment. This embodiment is different from the first embodiment in circuit configuration of the column circuit block 106. More specifically, a switch PXX and a switch P2R are added thereto. This configuration allows turning off the switch PXX and resetting the amplifier circuit 200a in the previous stage and the amplifier circuit 200b in the subsequent stage at independent times. This operation may reduce the resetting period and reduce a reading period.

Figure 7:
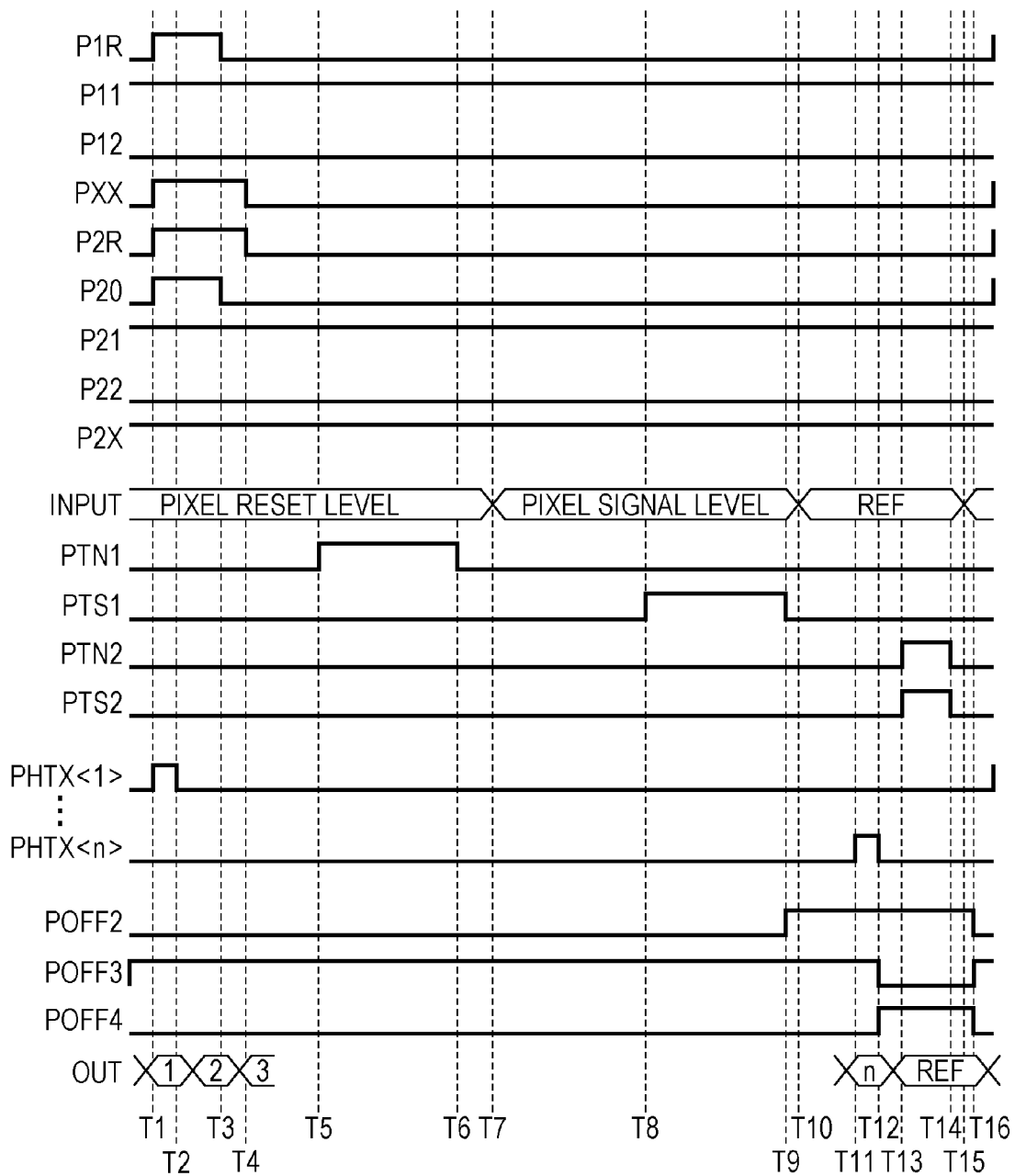
FIG. 7 illustrates drive pulses of the image pickup apparatus of the second embodiment.

FIG. 7 illustrates drive pulses of this embodiment. The basic drive sequence is the same as those in FIGS. 4 and 5. Except for the added control pulse PXX and control pulse P2R, the control pulses POFF2 to POFF4 for mode switching may be controlled in the same timing as the first embodiment.

Third Embodiment

Figure 8:
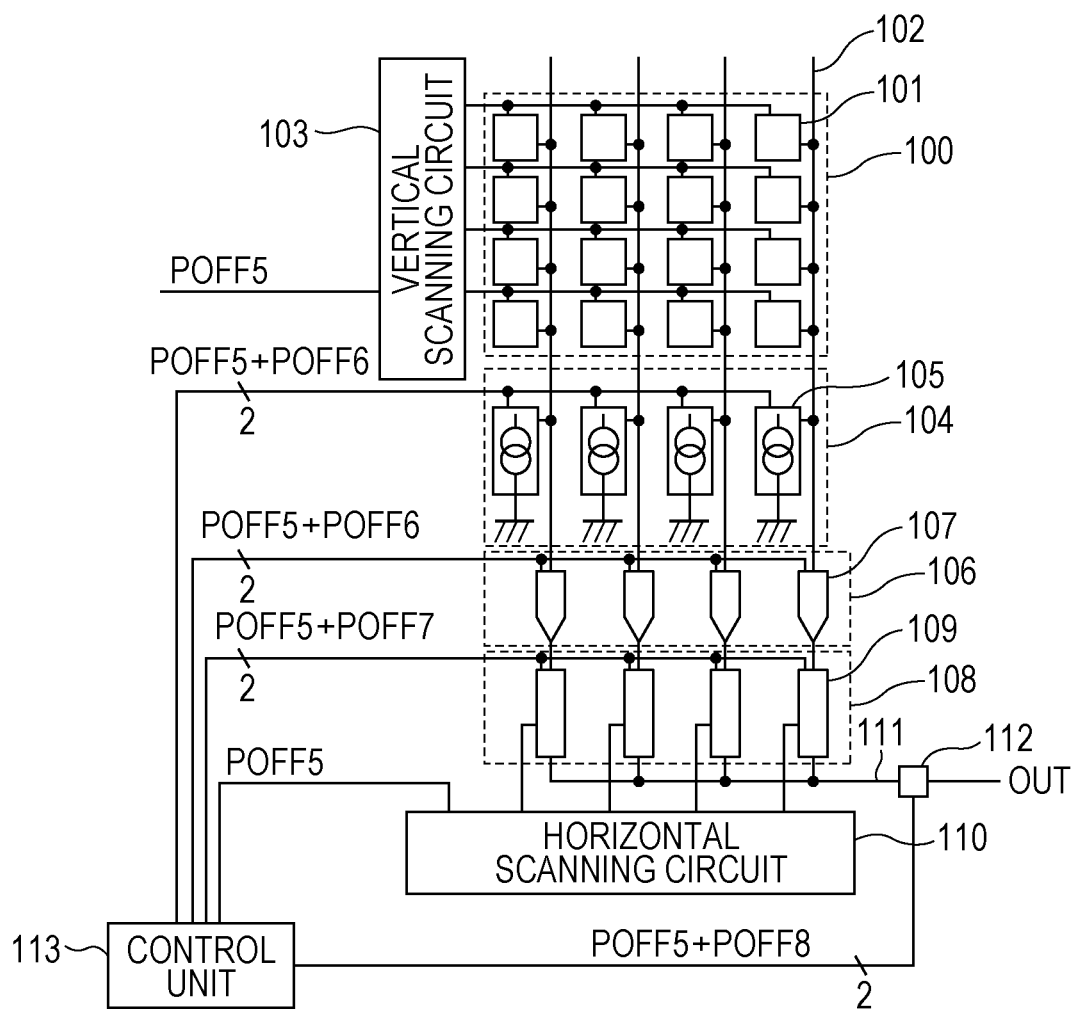
FIG. 8 is a block diagram of an image pickup apparatus according to a third embodiment.
Figure 9:
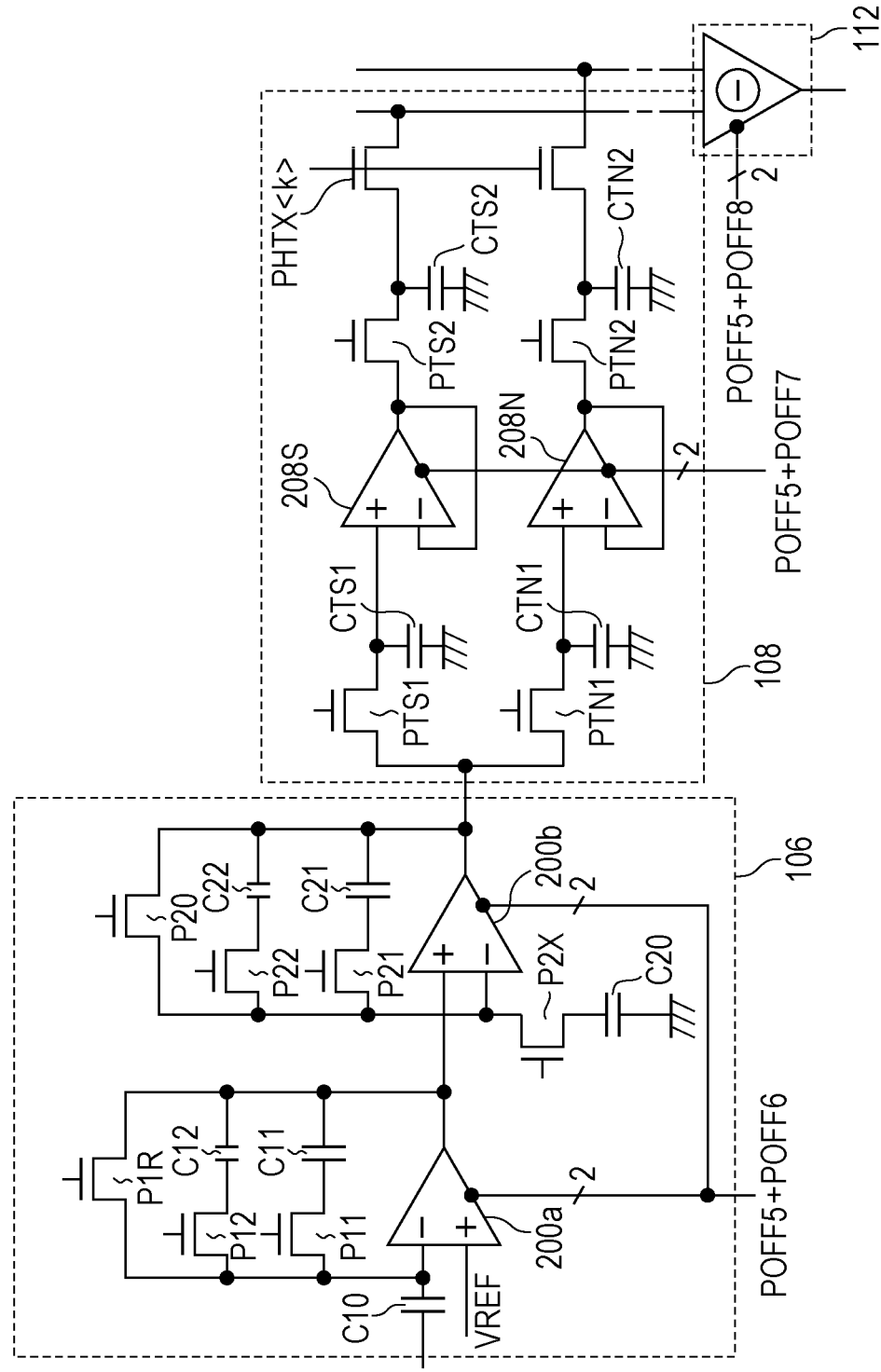
FIG. 9 is an equivalent circuit diagram of an image pickup apparatus of the third embodiment.

FIG. 8 illustrates an overall block diagram of an image pickup apparatus according to a third embodiment. FIG. 9 illustrates an equivalent circuit diagram of a column circuit of this embodiment. Like numerals refer to components having like functions to those in the first embodiment, and the detail descriptions will be omitted.

This embodiment is different from the first and second embodiments in control pulses to be supplied to circuit blocks for mode switching. According to this embodiment, a control pulse POFF5 is supplied to all circuit blocks, and control pulses POFF6 to POFF8 are supplied to the circuit blocks. The control pulse POFF5 may be supplied to the circuit blocks during a period when signals are stored in the pixels 101, for example. During the period while the pixels 101 are storing signals, the circuit blocks may not be required to perform operations. Thus, during this period, the circuit blocks are switched to the second mode in response to the control pulse POFF5. The circuit blocks may not operate without supply of a bias during the period. After this period ends, the mode of each of the circuit blocks is switched, as in the first and second embodiments.

Figure 10:
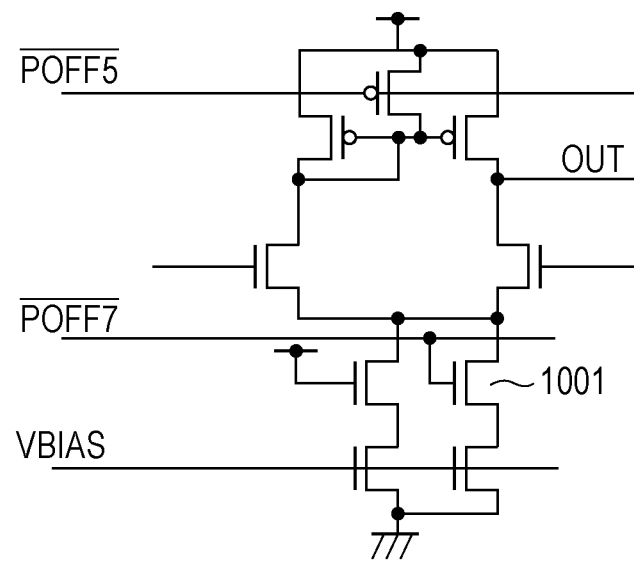
FIG. 10 is an equivalent circuit diagram of the image pickup apparatus of the third embodiment.

FIG. 10 illustrates an example of an equivalent circuit of a buffer 208 included in the signal holding block 108.

The operation of the buffer may be switched in response to the control pulse POFF5. More specifically, when the control pulse POFF5 has a high level, the buffer does not operate. That is, the buffer is in the second mode.

An NMOS transistor 1001 having a gate which receives a bar signal of the control pulse POFF7 does not receive a tail current and is turned off because the NMOS transistor 1001 is turned off when the control pulse POFF7 has a high level. That is, the NMOS transistor 1001 is switched to the second mode. At that time, the NMOS transistor 1001 may not be completely turned off but may be operated with a smaller amount of current. This operation may increase the speed for switching from the second mode to the first mode.

Application Examples to Image Pickup System

Figure 11:
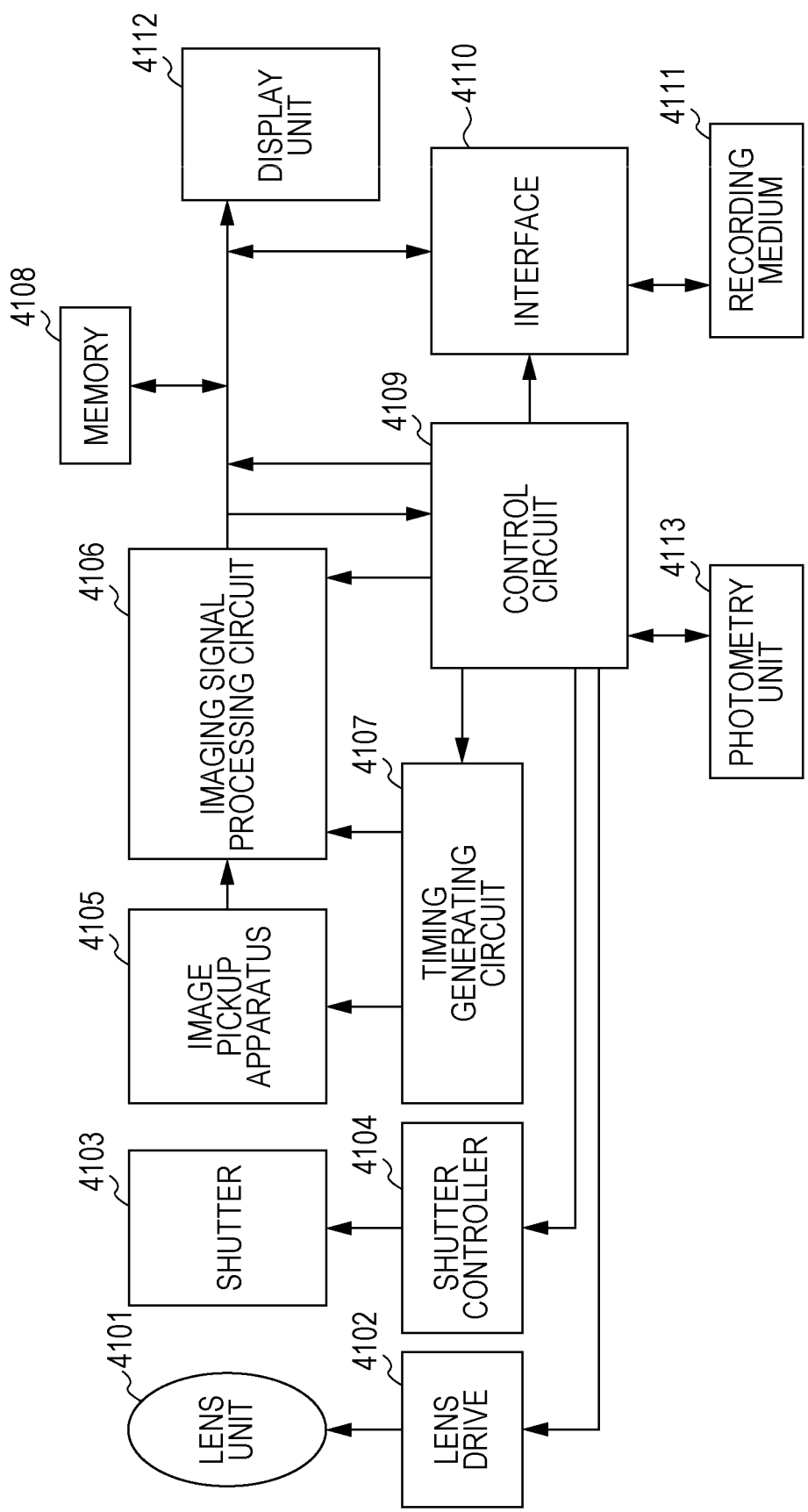
FIG. 11 is a block diagram of an image pickup system to which the image pickup apparatus of an embodiment is applicable.

FIG. 11 illustrates an example of an image pickup system to which an image pickup apparatus according to any one of the aforementioned embodiments is applicable.

Referring to FIG. 11, a lens unit 4101 forms an optical image of a subject in an image pickup apparatus 4105, and a lens drive 4102 may perform zoom control, focus control, aperture control and so on. A mechanical shutter 4103 is controlled by a shutter controller 4104.

The image pickup apparatus 4105 is used for capturing an image of a subject formed by the lens unit 4101 as an image signal. An imaging signal processing circuit 4106 may perform a correction on an image signal output from the image pickup apparatus 4105 and/or compress data. An image pickup apparatus of the present invention may be used as the image pickup apparatus 4105.

A timing generating circuit 4107 is a driving unit which outputs timing signals to the image pickup apparatus 4105 and imaging signal processing circuit 4106. A control circuit 4109 controls operations and the image pickup apparatus generally. A memory 4108 is used for temporarily storing image data. An interface 4110 may record or read to or from a recording medium. The mode switching of the present invention may be implemented by the timing generating circuit 4107 and control circuit 4109. Alternatively, a main part which performs the mode switching may be provided in the image pickup apparatus 4105.

A removable recording medium 4111 such as a semiconductor memory is used for recording or reading image data. A display unit 4112 displays information and/or a captured image.

Next, operations of a digital camera for imaging in the aforementioned configuration will be described.

When a main power supply is turned on, a control-related power supply is turned on, and a power supply for an imaging-related circuit such as the imaging signal processing circuit 1106 is turned on.

Then, when a release button (not illustrated) is pressed, a distance measurement operation is performed on basis of data from the image pickup apparatus 4105, and the control circuit 4109 calculates a distance to a subject on basis of the distance measurement result. After that, the lens drive 4102 drives the lens unit. Whether it is in focus or not is determined. If it is determined it is not in focus, the lens unit is driven again to perform a distance measurement. The distance measurement operation may be performed by a device specially for distance measurement (not illustrated) rather than a distance measurement based on data from an image pickup apparatus.

After it is determined that the lens is in focus, an imaging operation starts. After the imaging operation ends, an image signal output from the image pickup apparatus 4105 undergoes image processing by the imaging signal processing circuit 4106 and is written to memory by the control circuit 4109. The imaging signal processing circuit may perform sorting processing, adding processing and select processing therefor. Data stored in the memory 4108 is recorded in a removable recording medium 4111 such as a semiconductor memory through a recording medium control I/F unit 4110 under control of the control circuit 4109.

The data may be input directly to a computer via an external I/F unit (not illustrated) to process the image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-063731, filed Mar. 21, 2012, which is hereby incorporated by reference herein in its entirety.

What is claimed is:

1. An image pickup apparatus comprising, on a semiconductor substrate, an imaging area having a plurality of pixel columns and a plurality of column circuits each of which is provided for each pixel column or a plurality of pixel columns, wherein
    each of the column circuits has a first circuit block and a second circuit block, and the first and second circuit blocks receive a bias voltage via a common wire;
    the first circuit block includes an amplifier circuit;
    the second circuit block is configured to be capable of switching between a first mode and a second mode with smaller power consumption than the first mode; and
    a shift period from the second mode to the first mode by the second circuit block is a period excluding a period during which an amplifier circuit in the first circuit block is performing an amplifying operation.

2. The image pickup apparatus according to claim 1, wherein the amplifier circuit has an amplifier circuit in a previous stage and an amplifier circuit in a subsequent stage which amplifies a signal from the amplifier circuit in the previous stage.

3. The image pickup apparatus according to claim 1, wherein the second circuit block has a signal holding unit which stores or holds a signal amplified by the amplifier circuit.

4. The image pickup apparatus according to claim 1, wherein the pixel has a pixel amplifying unit.

5. The image pickup apparatus according to claim 4, further comprising a bias supply unit which supplies a bias current to the pixel amplifying unit.

6. The image pickup apparatus according to claim 5, wherein the bias supply unit operates by switching between a third mode and a fourth mode with smaller power consumption than the third mode.

7. The image pickup apparatus according to claim 1, wherein the amplifier circuit operates by switching between a fifth mode and a sixth mode with smaller power consumption than the fifth mode.

8. The image pickup apparatus according to claim 3, wherein a signal held in the signal holding unit is scanned by a horizontal scanning circuit sequentially or randomly and is output to an output unit.

9. An image pickup apparatus comprising, on a semiconductor substrate, an imaging area having a plurality of pixel columns and a plurality of column circuits each of which is provided for each pixel column or a plurality of pixel columns, wherein
    each of the column circuits has an amplifier circuit and a signal holding unit which stores or holds a signal amplified by the amplifier circuit, and the amplifier circuit and signal holding unit receive a bias voltage via a common wire;
    the amplifier circuit is configured to be capable of switching between a first mode and a second mode with smaller power consumption than the first mode;
    the signal holding unit is configured to be capable of switching between a third mode and a fourth mode with smaller power consumption than the third mode; and
    a shift period from the fourth mode to the third mode is a period excluding a period during which the amplifier circuit is operating in the first mode.

\* \* \* \* \*